H. L. DOHERTY.
PROCESS OF REMOVING SUSPENDED MATTER FROM GASEOUS FLUIDS.
APPLICATION FILED APR. 13, 1911.
1,071,893.
Patented Sept. 2, 1913.
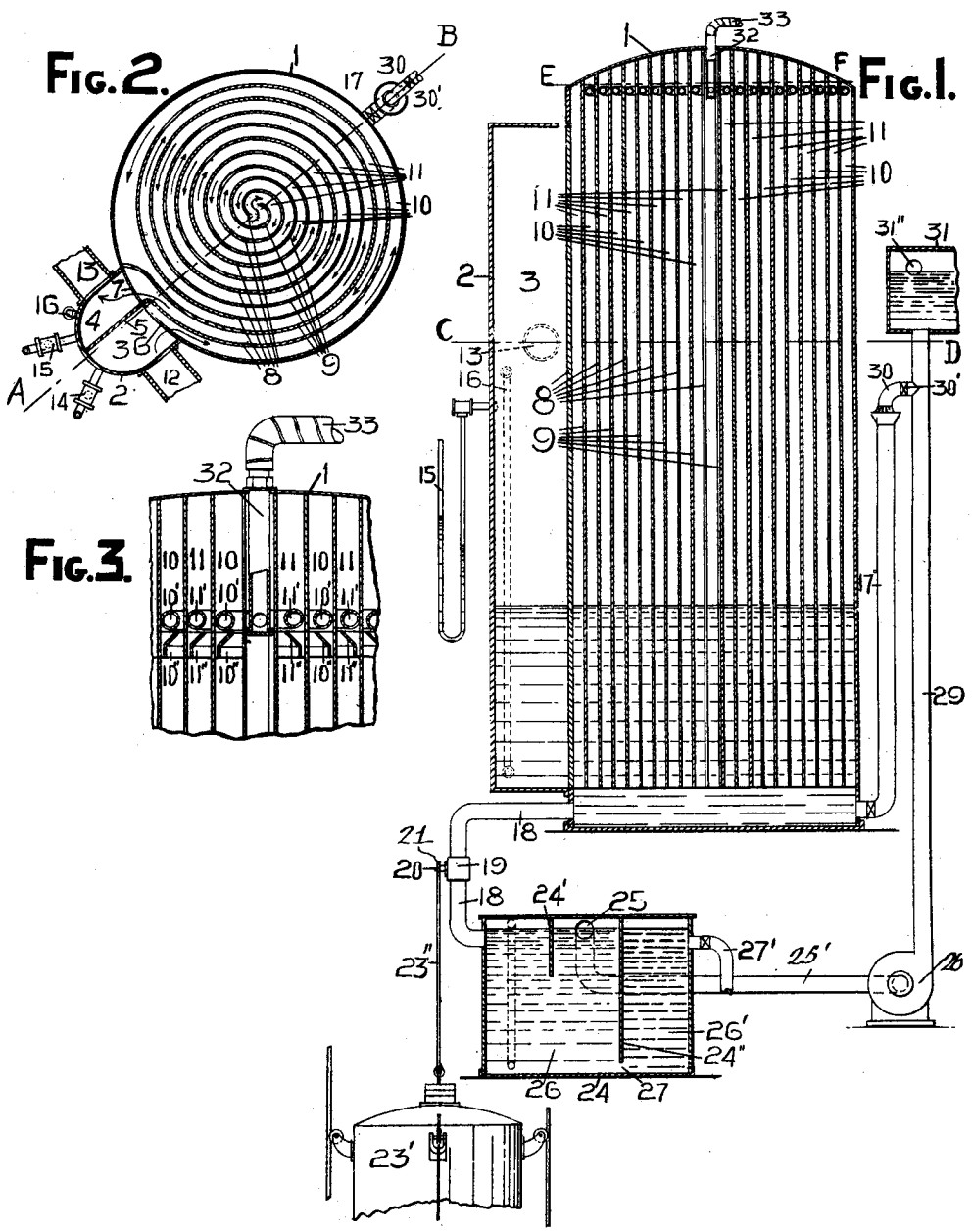
Witnesses: 
Henry L. Doherty, Inventor
By his Attorney

UNITED STATES PATENT OFFICE.

HENRY L. DOHERTY, OF NEW YORK, N. Y.

PROCESS OF REMOVING SUSPENDED MATTER FROM GASEOUS FLUIDS.

1,071,893.     Specification of Letters Patent.     Patented Sept. 2, 1913.

Application filed April 13, 1911. Serial No. 620,861.

*To all whom it may concern:*

Be it known that I, HENRY L. DOHERTY, a citizen of the United States, and a resident of New York city, in the county of New York and State of New York, have invented certain new and useful Improvements in Processes of Removing Suspended Matter from Gaseous Fluids, of which the following is a specification.

This invention relates to a process of removing suspended matter from gaseous fluids, and, in particular, to a type of such process in which the gaseous current is caused to follow a spiral path.

The object of my invention is to provide an improved process for separating from a gaseous current substantially all of the suspended liquid and solid particles which it contains, with special reference to the removal of tar and dust particles from illuminating gas.

In my invention which is the subject of Letters Patent No. 798,667, dated Sept. 5th, 1905, I have revealed an apparatus for accomplishing the above object by passing the gaseous current through a helical passage at a rapid rate, whereby a rapid rotary motion is given to the current and the suspended liquid and solid particles are thrown off by the centrifugal force thus developed. In my co-pending applications Ser. Nos. 535,842 and 535,843, filed Dec. 31st, 1909, I have shown improvements on the invention referred to above by virtue of which I am enabled to communicate a whirling motion to the gas by causing it to traverse a spiral passage. This present invention relates to a modification of the latter invention by virtue of which I am enabled to communicate a whirling motion to the gas first in one direction and then in the other by causing it to traverse a double spiral passage—the gas passing through one passage from the peripheral extremity to the inner of the one passage and thence back to the peripheral extremity of the other passage, or vice versa.

In the accompanying drawings I have shown a form of apparatus for applying the process of my invention, which apparatus I have claimed in application Ser. No. 688538, filed Apr. 4th, 1912, the present application being limited to the process.

Figure 1 is a vertical cross-section of the apparatus on the line A—B of Fig. 2. Fig. 2 is a horizontal cross-section on the line C—D of Fig. 1. Fig. 3 is a part vertical diametral cross-section on an enlarged scale of the upper portion of the apparatus showing the device for providing a film of liquid on the spiral surface when the gas treated does not contain liquid in suspension, or when it is desired to treat the gas with an absorbent liquid of special character.

1 designates the separating chamber proper. Attached to 1 is a sheet, 2, having a partition, 5, which forms the gas inlet and outlet chambers, numbered 3 and 4 respectively. A vertical slot is cut in the wall of chamber 1 which extends the full height of chambers 3 and 4 and forms the gas inlet and outlet ports, numbered 6 and 7 respectively. Attached to partition 5 is the peripheral termination of a spiral wall, 8. Another spiral wall, 9, parallel to 8, is attached to the wall of 1 at the side of port 7. There are thus formed two spiral passages, 10 and 11, which serve as inflow and outflow passages for the gas. As shown, these passages are in communication at the axial part of 1 and may be used interchangeably. Passage 10 communicates with chamber 3 and passage 11 with chamber 4. With the arrangement of the apparatus shown, 12 is the gas inlet pipe, 13 the gas outlet pipe.

14 and 15 are pressure gages in communication, respectively, with chambers 3 and 4.

16 is a gage indicating the level of the liquid in tank 1.

17 is the pipe through which liquid is supplied to the tank 1, and 18 is the pipe through which liquid is withdrawn from tank 1.

19 is a cock on 18 which is arranged to be actuated through the rocking arm 20 by the relative movement of the lifts of the two small gas holders in communication with the inlet passage 12 and outlet passage 13, respectively. The stem, 20, of cock 19 bears the rocking arm 21. The ends of 21 are connected respectively with lifts of the small gas holders, of which one, numbered 23', is shown in part.

24 is a tar separating chamber which separates the heavy tarry matter from the liquor drawn off from the separator. A baffle-plate, 24', in 24 prevents the direct flow of liquor from the inlet pipe 18 to the outlet 25. 24'' is another baffle reaching nearly to the bottom of 24 but leaving a passage, 27, through which the tar chamber 26' and the liquor chamber 26 communicate. The tar collects in the bottom of 26 and passes thence into 26' through 27 as tar is withdrawn through 27'. The tar-free liquor is drawn off from 24 through the pipe 25 and raised by the circulating pump 28 to the reservoir 31 through the pipe 29. Any surplus liquor which enters the system by condensation from the gas, or otherwise, is withdrawn through the overflow 31''. The circulating pump 28 is thus always discharging against the head of liquid in reservoir 31. The reservoir 31 should have a capacity such that the level of the liquid will not be materially affected by fluctuations in the circulation of the liquid, in order that a fairly constant head may be maintained on the valve 30'. When the liquid passing through the pump is below the normal quantity the deficiency is supplied by the liquid in 31. When the liquid passing through the pump is greater than the normal quantity the excess enters the reservoir 31, again filling the latter.

10' and 11' are two pipes placed respectively in the spiral passages 10 and 11 through which water or any other liquid may be supplied to establish a film of liquid on the spiral walls of the separator when the gas itself does not contain liquid in suspension. In such case, liquid is supplied to the separator through the pipes 33 and 32. Deflecting sheets, 10'' and 11'', respectively, cause the liquid discharged from 10' and 11' to follow the respective spiral walls.

In the operation of the apparatus to carry out my process, the gas is conducted to the separator through the pipe 12, flows through the chamber 3 and the spiral passage 10 to the central portion of the chamber 1, back through the spiral passage 11 to the gas outlet chamber 7 and thence discharges through the pipe 13. The movement of the gas may be effected either by induced or forced draft, the requirement being simply that there should exist a sufficient difference in pressure between 12 and 13 to impart the required velocity to the gas. In this embodiment of my invention the method of operation is as follows: Water is supplied to 1 from 31 through the pipes 30 and 17 until the gage 16 shows that the proper normal level of the liquid has been attained. The pump 28 is now started and cock 19 adjusted to its normal position. Additional water, if necessary, is run into tank 31. Valve 30' is adjusted so that the liquid just fails to flow through pipe 31''. The gas is turned on through the pipe 12, under the necessary pressure and enters the outer convolution of passage 10, passes to the center of the tank 1, as already described, and thence back through the passage 11 to the outlet chamber 4, from which it discharges through the passage 13. As the gas passes toward the center of the separator 1 it takes on a higher and higher angular velocity. Returning to the periphery through the passage 11 the angular velocity of the gas diminishes with the increase in the radius of the circular path which it is traversing. From 4, the gas passes to any other condensing and purifying apparatus which may be used. During its passage through the separator, the angular velocity communicated to the gas generates sufficient centrifugal force to throw the suspended liquid or solid particles to the periphery of the gas stream and therefore into contact with the outer wall of the spiral. This soon becomes coated with a film of tar, which in turn assists in the removal of other tar globules from a fresh portion of the gas. The simple projection of dust particles against a vertical wall would not effect entirely their withdrawal from the gas stream as the buoyant effect of the current of gas moving at a high velocity and the contact friction between the gas and dust would sweep the particles along even while in contact with the wall of the passage. The tarry liquid, however, possesses a considerable surface tension, and adheres to the wall with considerable tenacity—sufficient, in fact, to resist the tendency that the friction of the gas current has to sweep the deposited particles back into the current. This tarry film seizes the liquid globules and dust particles as they come in contact with the wall and withdraws them from the influence of the current of gas sweeping through the passage 7. As the deposit on the wall accumulates, the outer layer forms innumerable rivulets, or a continuous film, which run off into the liquid seal in the bottom of 1. The force of adhesion between the tar and wall, however, suffices to keep the latter coated with a comparatively thick continuous film.

Having described my invention, what I claim is:—

1. The process of separating from a body of gaseous fluid particles suspended therein, which consists in imparting a spiral motion to the said gaseous fluid first in one direction of rotation and then in the opposite direction.

2. The process of separating from a body of gaseous fluid particles suspended therein, which consists in causing the said gaseous fluid to traverse a spiral path from the peripheral extremity toward the point of origin of the said spiral, and thence traverse a second spiral path from the inner to the peripheral extremity of the same.

3. The process of separating from a body of gaseous fluid particles suspended therein, which consists in imparting to the said gaseous fluid, first, a gradually accelerating angular motion and then subjecting the said gaseous fluid to a gradually decelerating angular motion.

4. The process of separating from a body of gaseous fluid particles suspended therein, which consists in imparting an angular motion to the said gaseous fluid, gradually accelerating the said angular motion to a maximum, and then gradually decelerating the said angular motion to a minimum.

5. The process of separating from a body of gaseous fluid particles suspended therein, which consists in imparting a spiral motion to the said gaseous fluid first in one direction of rotation and then in the opposite direction, and at the same time contacting the said gaseous fluid with a film of liquid.

6. The process of separating from a body of gaseous fluid particles suspended therein, which consists in causing the said gaseous fluid to traverse a spiral path from the peripheral extremity to the point of origin of said spiral and thence traverse a second spiral path from the inner to the peripheral extremity of the same, and during the said travel of the gaseous fluid contacting the same with a film of liquid.

7. The process of separating from a body of gaseous fluid particles suspended therein, which consists in imparting to the said gaseous fluid a gradually accelerating angular motion and then subjecting the said gaseous fluid to a gradually decelerating angular motion, while at the same time contacting the said gaseous fluid with a film of liquid.

8. The process of separating from a body of gaseous fluid particles suspended therein, which consists in imparting an angular motion to the said gaseous fluid, gradually accelerating the said angular motion to a maximum, then gradually decelerating the said angular motion to a minimum, the said gaseous fluid being contacted with a film of liquid while undergoing said angular motion.

Signed at New York city in the county of New York and State of New York this 12th day of April A. D. 1911.

HENRY L. DOHERTY.

Witnesses:
J. M. McMILLIN,
F. L. BLACKBURN.